(12) United States Patent
Hector et al.

(10) Patent No.: US 6,332,942 B1
(45) Date of Patent: Dec. 25, 2001

(54) METHOD FOR ASSEMBLING A HUB TO AN OPTICAL DISK

(75) Inventors: Wayne M. Hector, Shoreview; Harold J. DeBlieck, White Bear Lake; Joseph F. Fuller, Vadnais Heights; Robert J. Hanowski, Forest Lake, all of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/408,456

(22) Filed: Sep. 30, 1999

(51) Int. Cl.[7] .............................. B32B 31/12; B32B 31/28
(52) U.S. Cl. .................................. 156/273.7; 156/275.7; 156/379.8; 156/538; 156/556; 156/580
(58) Field of Search ............................ 156/60, 272.2, 156/273.7, 275.5, 275.7, 293, 295, 379.8, 538, 539, 556, 580

(56) References Cited

U.S. PATENT DOCUMENTS 5,080,736 * 1/1992 Matsui ................................. 156/64
5,709,764 * 1/1998 Funawatari et al. .............. 156/275.7

* cited by examiner

Primary Examiner—Michael W. Ball
Assistant Examiner—John T. Haran
(74) Attorney, Agent, or Firm—Eric D. Levinson

(57) ABSTRACT

A method and apparatus for assembling a hub to an optical disk with an adhesive. The optical disk includes opposing first and second major surfaces and a central opening. The adhesive is predisposed onto the second major surface. The method includes supporting the first major surface of the disk at a defined three-dimensional position and orientation. The hub is aligned above the central opening of the disk such that the hub is movable to a plurality of three-dimensional positions and orientations with a hub placement assembly supporting an inner portion of the hub. The defined three-dimensional position and orientation of the first major surface is transferred to the hub placement assembly. The hub is maneuvered into contact with the adhesive by the hub placement assembly. More particularly, a final, three-dimensional position and orientation of the hub relative to the disk is dictated by the hub placement assembly as a function of the defined three-dimensional position and orientation of the first major surface.

19 Claims, 15 Drawing Sheets

METHOD FOR ASSEMBLING A HUB TO AN OPTICAL DISK

BACKGROUND OF THE INVENTION

The present invention relates to the field of manufacture of optical data storage disks. More particularly, the present invention relates to a method and apparatus for assembling a hub to an optical disk with minimal mechanical runout on a mass production basis.

Optical data disks are a popular media choice for the distribution, storage and accessing of large volumes of data. Examples of information stored on optical data disks include audio and video program material, as well as computer programs and data. Formats of optical data disks include audio CD (compact disk), CD-R (CD-readable), CD-ROM (CD-read only memory), DVD (digital versatile disk or digital video disk) media, DVD-RAM (random access memory), various types of rewritable media, such as magneto-optical (MO) disks (including near field recording technology) and phase change optical disks.

A typical optical disk assembly includes a plastic optical disk substrate and a hub. The optical disk substrate includes opposing, first and second major surfaces and a central opening. For most applications, data tracks are formed in the first major surface (or reference surface), although data tracks may also be formed in the second major surface. The hub is adhered to the second major surface about the central opening with an adhesive such as a glue. During use, a chuck associated with a disk drive engages the hub and rotates the optical disk assembly by rotatably driving the hub.

Various techniques and processing equipment have been employed to assemble the hub to the optical disk substrate. As a general statement, these techniques are based upon prior art methodologies for mounting a hub to metal-based disk substrate (e.g., an aluminum-based hard disk). Thus, for example, a hub is typically affixed to the surface of an optical disk with an adhesive (e.g., a glue bead). The mounting location for the hub on the optical disk is typically near or at the inner diameter of the optical disk surface. For example, the disk substrate may be generally supported at the bottom (or first major) surface while the hub is axially aligned with the central opening and pressed into contact with the adhesive and the top (or second major) surface of the disk substrate. The fixture used to support the disk substrate is independent of the assembly used to press the hub into engagement with the adhesive/disk substrate. Further, during the fitting process, only a top portion of the hub is supported.

It is vital that the hubbing process result in the hub being planar with the reference (or first major) surface of the optical disk substrate. To this end, advancements in optical disk technology and the demand for increased disk capacity has resulted in a greater amount of information being stored within the same sized area of a disk surface. Such high capacity optical disks require more complex optical disk readers/recorders. Near field recording is one form of optical recording that is capable of producing extremely small spot sizes, for example, on magneto-optic disk media. For near field recording, a solid immersion lens (SIL) can be used to transmit an optical beam across an extremely thin air bearing, and through the top of the recording medium onto the recording layer. The beam is "air-incident" in the sense that it does not pass through the disk substrate before it reaches the recording layer. This aspect of near field recording differs from the substrate-incident techniques used in conventional magneto-optic recording, in which the beam passes through the substrate. A SIL can be integrated within a flying magnetic head assembly that hovers above the optical disk during operation and provides the magnetic bias for magneto-optic recording. For near field recording, the thickness of the air gap is less than one wavelength of the recording beam. Because of the tight physical characteristics of the near field recording process, it is critical that the hub be mounted parallel to the surface of the optical disk substrate. Since the gap between the flying magnetic head assembly and the surface of the disk is less than one wavelength of the recording beam (two to four microinches), excessive or any tilt in the optical disk during operation can result in a head crash (i.e., physical contact of the head with the disk) or disk drive failure.

Although the importance of hub-to-disk surface planarity has been recognized, currently available hubbing techniques have not kept pace with the advancements in optical disk media described above. That is to say, for end use applications that can tolerate minor deviations in hub planarity, the press fitting-type hub assembly processes are acceptable. However, where even a slight deviation in hub/disk surface planarity cannot be tolerated (such as described above), fitting a hub onto the disk surface without evaluating or otherwise accounting for inconsistencies in disk substrate planarity will likely result in an unacceptable product.

The main issue underlying unacceptable hub assembly is the fact that for a plastic-based disk substrate, the opposing major surfaces are virtually never planar. Unlike a metal-based substrate, the opposing major surfaces of an optical disk substrate are never precisely planar at any one location, even though the disk substrate is molded and grounded to strict tolerances. As a result, the opposing surfaces are essentially not parallel. Standard hubbing techniques assume, however, that the opposing surfaces are planar and parallel. For example, a typical hubbing device includes a flat disk support surface and a hub placement device. The disk substrate is laid on top of the flat disk support surface such that the first major surface (or reference surface) is supported. The hub placement device orientates an individual hub such that the hub is planar relative to the flat disk support surface and guides the hub into contact with the second major surface of the disk based upon this assumption. However, as described above, the first major surface of a plastic disk substrate will not be precisely parallel or planar relative to the flat disk support surface. Additionally, the second major surface of the disk substrate will also not be perfectly parallel or planar relative to the flat disk support surface or the first major surface. As a result, orientation of the hub relative to the flat disk support surface effectively bears no precise relation to the actual planarity of the second major surface. Further, by undiscernibly fitting the hub to the second major surface, orientation of the hub is entirely unrelated to planarity of the first major surface, into which data tracks are formed. Thus, it is virtually impossible for the hub to be precisely planar with the first major surface as the hub is essentially permanently orientated to be planar with the flat disk support surface and/or the second major surface, leading to axial and radial run-out problems. Additional performance concerns may arise due to the deflectability of the plastic-based disk substrate (e.g. dishing) and concentricity of the hub relative to the disk substrate.

Optical data disks continue to be extremely popular for storing large volumes of data. To this end, a plastic-based optical disk offers high performance capabilities at a relatively low cost. However, inherent imperfections in the disk substrate itself greatly hinder hub assembly within certain tolerance ranges using available mounting techniques.

Therefore, a substantial need exists for a mass production method and apparatus for assembling a hub to an optical disk substrate that produces optical disk assemblies with minimal axial and radial runout, optimal concentricity and limited dishing.

SUMMARY OF THE INVENTION

One aspect of the present invention relates to a method of assembling a hub to an optical disk with an adhesive. The optical disk includes first and second major surfaces and a central opening, with the adhesive being predisposed onto the second major surface for receiving and adhering the hub. The method includes supporting the first major surface of the disk at a defined three-dimensional position and orientation. The hub is then aligned above the central opening of the disk with a hub placement device such that the hub is movable to a plurality of three-dimensional positions and orientations. That is to say, prior to actual mounting, the hub can be repositioned to a variety of different three-dimensional positions and orientations. Further, the hub placement device supports an inner portion of the hub. The defined three-dimensional position and orientation of the first major surface is then transferred to the hub placement device. Finally, the hub is maneuvered into contact with the adhesive. In this regard, a final three-dimensional position and orientation of the hub relative to the adhesive is dictated by the hub placement device as a function of the defined three-dimensional position and orientation of the first major surface. With this approach, a final position and orientation of the hub is independent of any planar irregularities between the first and second major surfaces.

Another aspect of the present invention relates to a method of assembling a hub to an optical disk with an adhesive. The optical disk includes first and second major surfaces and a central opening. The adhesive is predisposed onto the second major surface for receiving and adhering the hub. The method includes supporting the first major surface of the disk at a defined three-dimensional position and orientation in space. An inner portion of the hub is supported and aligned above the central opening of the disk. More particularly, the hub is maintained so as to be moveable to a plurality of three-dimensional positions and orientations. A desired three-dimensional position and orientation of the hub is then defined based upon the defined three-dimensional position and orientation of the first major surface. Finally, the hub is directed into contact with the adhesive at the desired three-dimensional position and orientation. Effectively, a final position and orientation of the hub once placed into contact with the adhesive is a function of the defined three-dimensional position and orientation of the first major surface and therefore is independent of any disk irregularities.

Yet another aspect of the present invention relates to an apparatus for mounting a hub to an optical disk substrate with an adhesive. The optical disk substrate includes first and second major surfaces and a central opening. The adhesive is predisposed onto the second major surface. The apparatus comprises a disk fixture assembly and a hub placement device. The disk fixture assembly includes a disk support surface configured to fixably support the first major surface of the optical disk substrate at a defined three-dimensional position and orientation. Finally, the hub placement device is configured to support an inner portion of a hub and position the hub relative to the disk substrate. In this regard, the hub placement device is configured to selectively communicate with a portion of the disk fixture assembly in a mounting position such that the hub contacts the adhesive at a three-dimensional position and orientation directly related to the defined three-dimensional position and orientation of the first major surface. With this apparatus, the hub does not contact the disk substrate in the mounting position. Instead, the hub contacts only the adhesive and can thus be maneuvered to the desired three-dimensional position and orientation.

BRIEF DESCRIPTION OF THE DRAWINGS

The accompanying drawings are included to provide a further understanding of the present invention and are incorporated in and constitute a part of the specification. The drawings illustrate the embodiments of the present invention and together with the description serve to explain the principles of the invention. Other embodiments of the present invention and many of the intended advantages of the present invention will be readily appreciated as the same becomes better understood by reference to the following detailed description when considered in connection with the accompanying drawings, in which like reference numerals designate like parts throughout the figures.

DETAILED DESCRIPTION OF THE PREFERRED EMBODIMENTS

A. Optical Disk Assembly 20

Figure 1:
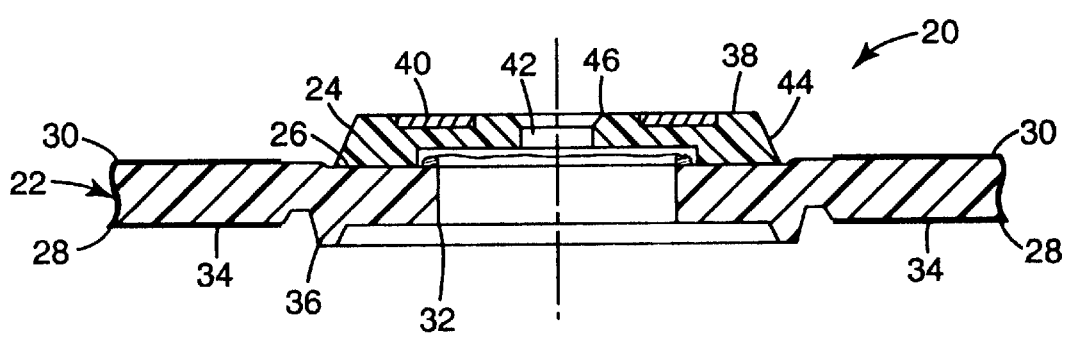
FIG. 1 is a partial, cross-sectional view of an optical disk assembly manufactured in accordance with the present invention.

The present invention relates to a method and apparatus for manufacture of an optical disk assembly, and in particular assembling a hub to an optical disk substrate (or "optical disk"). As a point of reference, FIG. 1 provides a partial cross-sectional view of an optical disk assembly. The optical disk assembly 20 includes an optical disk 22 and a hub 24. As described in greater detail below, the hub 24 is secured to the optical disk 22 by an adhesive 26, such as a glue. The optical disk 22 includes a first major surface 28, a second major surface 30 and a central hole 32 defined by an inner diameter. The optical disk 22 may have information (shown generally at 34) encoded (i.e., formatted) on the first major surface 28, the second major surface 30, or both of the major surfaces 28, 30. In the illustrated embodiment, the optical disk 22 has the information 34 encoded on the first major surface 28.

The optical disk 22 is preferably formed from plastic and can comprise any of a variety of pre-recorded, writable or rewritable disk media with a variety of form factors and formats. In particular, the optical disk 22 may comprise any of a variety of optical disks including magneto-optic, phase change, CD, CD-ROM, CD-R, or DVD disks. The optical disk 22 may conform to different form factors such as 2.5 inch, 3.5 inch, 5.25 inch, 120 millimeter, 130 millimeter, etc. In one exemplary embodiment, the optical disk 22 is a 130 millimeter magneto-optical (MO) disk useful in near-field recording applications. Alternatively, the optical disk 22 may be formed from other known materials, including glass or metal.

The information 34 may be stored on either or both of the major surfaces 28, 30 of the optical disk 22 as a series of lower reflectants "pits" bored within a plane of higher reflectants "lands". For writable optical disks, such as magneto-optical disks or phase change optical disks, either or both of the major surfaces 28, 30 include a surface relief pattern (not shown), including a series of lands and pits arranged in a spiral track. The information 34 is encoded within readable/writable material deposited over the surface relief pattern. In particular, the writable disks may include a spiral or concentric track formed in the disk substrate, wherein the information 34 is encoded in the writable material located in the region within the pits or on top of the lands.

In the exemplary embodiment, the first major surface 28 of the optical disk 22 forms a disk alignment feature (DAF) 36. The disk alignment feature 36 can be used to radially align the optical disk 22 during a hubbing process as described below.

The hub 24 serves to mount the optical disk assembly 20 to a disk drive (not shown). The hub 24 preferably includes a hub body 38 and an annular insert member 40. The hub body 38 is preferably made of a polymeric material, for example polycarbonate. The annular insert member 40 is preferably embedded into the hub body 38 and is made of a magnetic material or a material responsive to a magnetic field. Thus, for example, the annular member 40 may be a stainless steel insert. The hub body 38 is generally shaped as an inward disk-shaped washer having a central bore 42, and can be defined by an outer portion 44 and an inner portion 46. The outer portion 44 is generally bowed or crown shaped, whereas the inner portion 46 forms an outwardly extending flange.

Finally, the hub 24 is secured to the second major surface 30 of the disk 22 by the adhesive 26. In a preferred embodiment, the adhesive 26 is a UV curable glue.

B. Hubbing Apparatus 60

Figure 2:
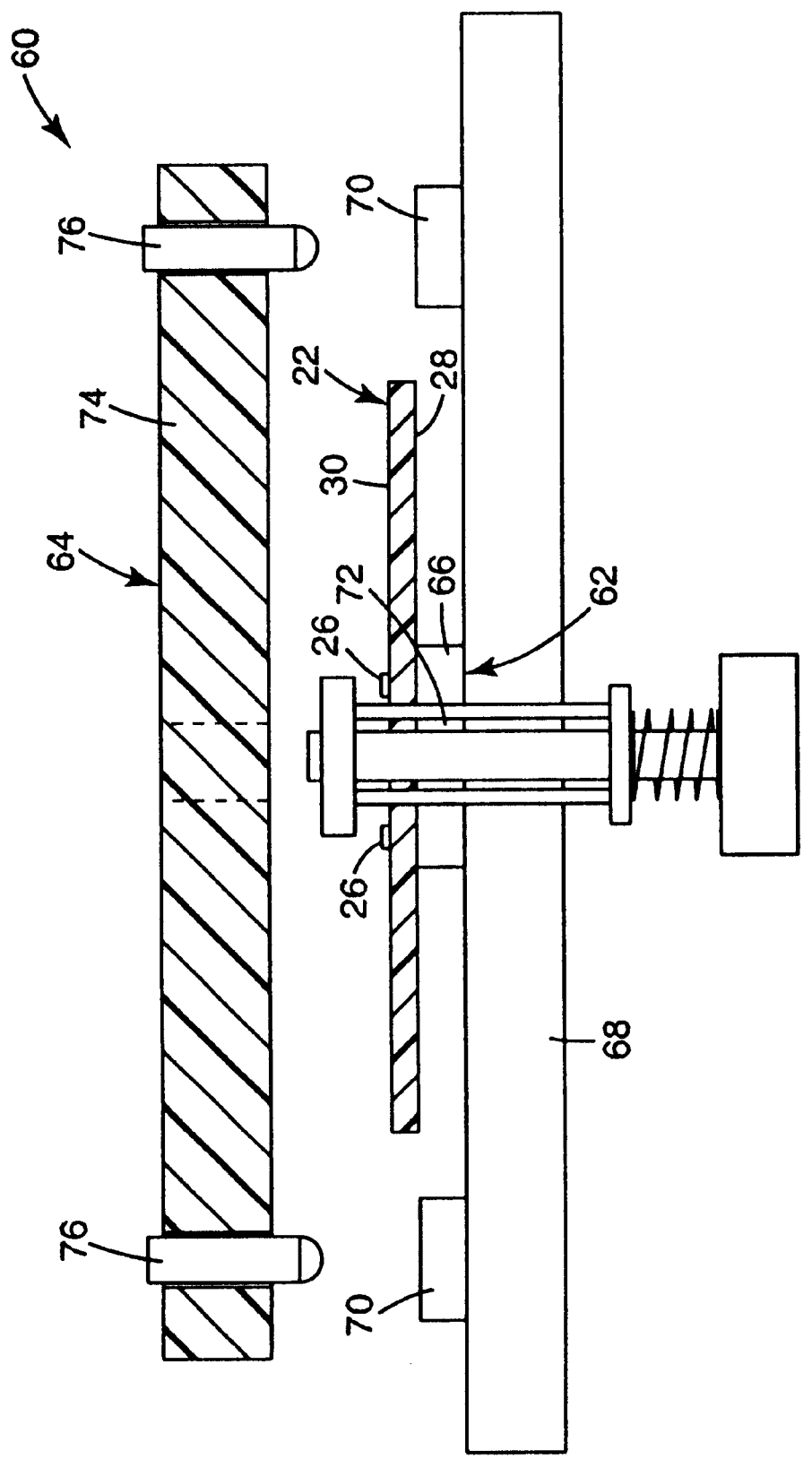
FIG. 2 is a schematic view of a hubbing apparatus in accordance with the present invention.

With the above general description of the optical disk assembly 20 in mind, one preferred embodiment of a hubbing apparatus 60 is shown schematically in FIG. 2. As a point of reference, the hubbing apparatus 60 is depicted as supporting the optical disk 22 and the hub 24. In general terms, the hubbing apparatus 60 includes a disk support assembly 62 and a hub placement assembly 64. Details on the various components of the hubbing apparatus 60 are provided below. In general terms, however, the disk support assembly 62 includes a disk support fixture 66, a base plate or platten 68 and standoffs 70. The hub placement assembly 64 includes a compliant hub support 72, a press plate 74 and extension arms 76. The disk support fixture 66 maintains the optical disk 22. Further, the compliant hub support 72 is associated with the disk support fixture 66 so as to extend through the optical disk 22 and selectively maintain the hub 24. Finally, the press plate 74 is positioned above the disk support assembly 62 and is driven in a vertical fashion.

During use, the disk support assembly 62 maintains the first major surface 28 of the optical disk 22 at a defined three-dimensional position and orientation. As used throughout this specification, the term "position" is in reference to any X-Y-Z location of the particular body's centroid, whereas "orientation" is in reference to the body's planar inclination. The adhesive 26 is predisposed onto the second major surface 30 of the optical disk 22. The press plate 74 is directed downwardly toward the optical disk 22, into engagement with the hub 24. The press plate 74 continues in a downward motion until the extension arms 76 contact the standoffs 70, respectively, in a mounting position. In the mounting position, the hub 24 contacts the adhesive 26, and the defined three-dimensional position and orientation of the first major surface 28 is transferred from the disk support assembly 62 to the press plate 74 via the standoffs 70 and the extension arms 76. Due to certain other design features described in greater detail below, the hub 24 is thereby directed into a preferred three-dimensional position and orientation relative to the first major surface 28. As a result, regardless of a planarity between the surfaces 28, 30 of the optical disk 22, the hub 24 is effectively optimally positioned relative to the optical disk 22.

C. Disk Support Assembly 62

Figure 3:
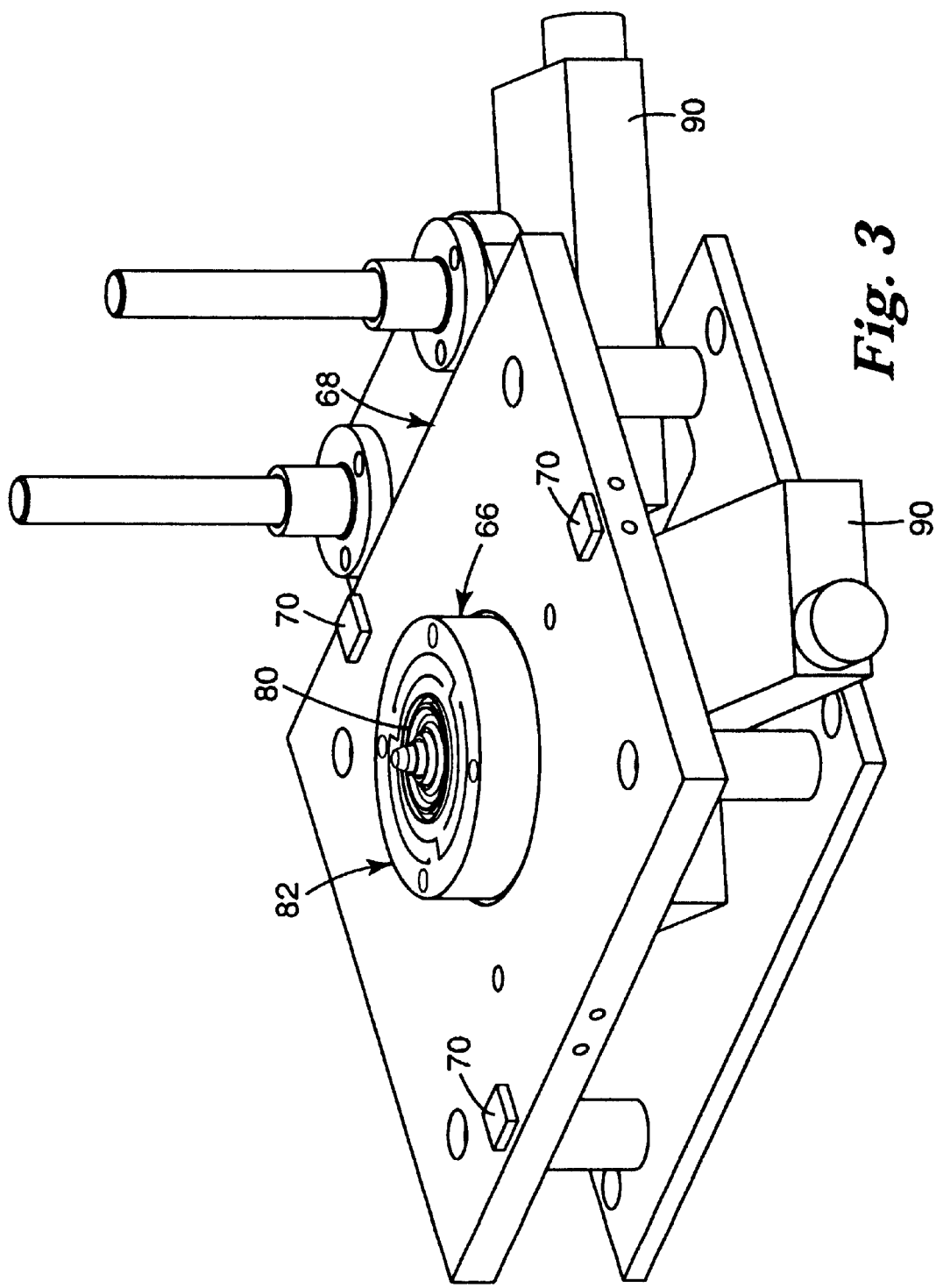
FIG. 3 is a perspective view of a disk support assembly portion of the hubbing apparatus of FIG. 2.

One preferred embodiment of the disk support assembly 62 is shown in greater detail in FIG. 3. For ease of illustration, the compliant hub support 72 (FIG. 2) has been omitted from FIG. 3. As previously described, the disk support assembly 62 includes the disk support fixture 66, the base plate 68 and the standoffs 70. The disk support fixture 66 includes, in one preferred embodiment, a planar support device 80 and a disk alignment fixture 82. Details on the various components comprising the disk support assembly 62 are provided below. Generally speaking, however, the disk support fixture 66, including the planar support device 80 and the disk alignment fixture 82, are centrally connected to the base plate 68. Similarly, the standoffs 70 extend from the base plate 68 apart from the disk support fixture 66.

Figure 4:
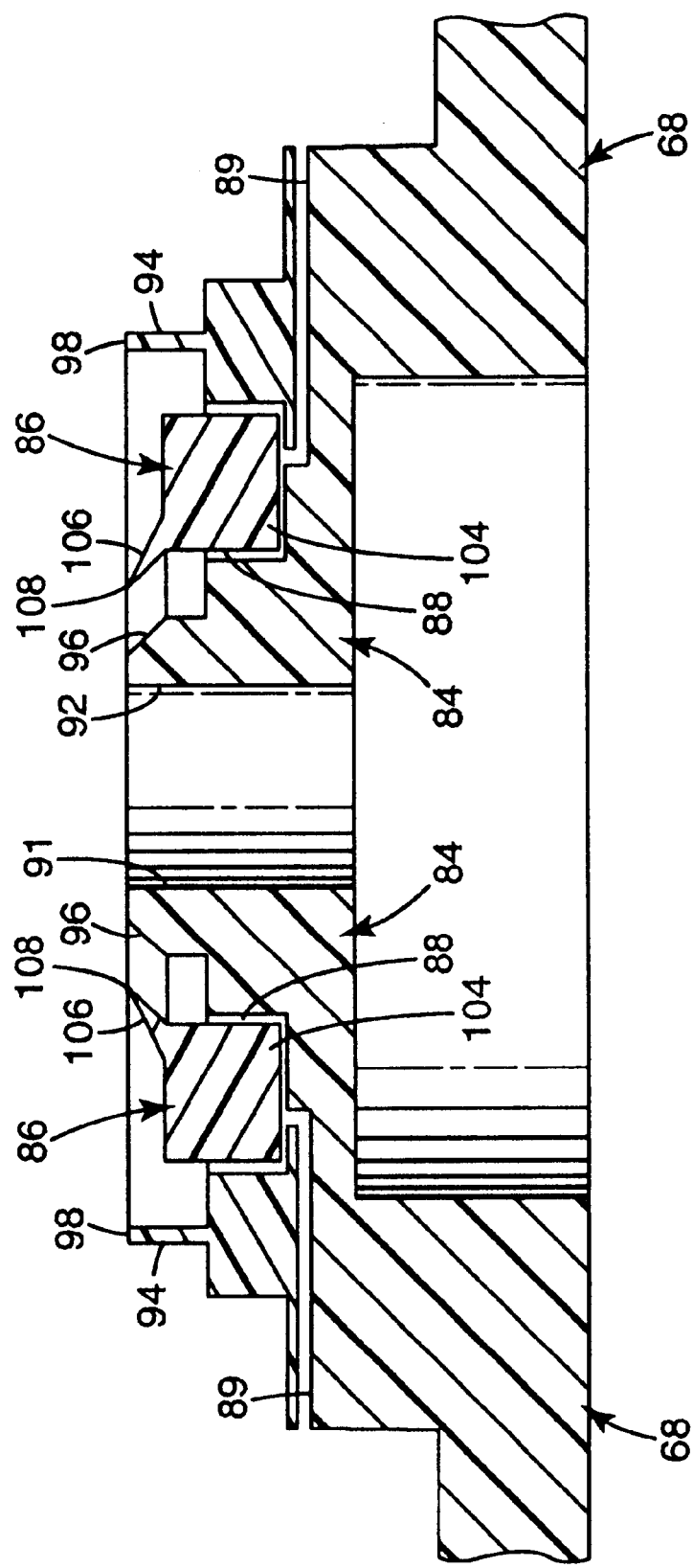
FIG. 4 is an enlarged, cross-sectional view of a planar support device portion of the disk support assembly.

As best shown in FIG. 4, the planar support device 80 includes a central extension piece 84 and a vacuum ring 86. The central extension piece 84 is generally ring-shaped and defines an annular slot 88 sized to receive the vacuum ring 86. Finally, the central extension member 84 defines a central passage 90 sized to allow passage of a portion of the compliant hub support 72 as described in greater detail below.

The central extension piece 84 is preferably a rigid material, such as stainless steel, and is integrally formed with the base plate 68. Alternatively, the central extension member 84 may be a separate component connected to the base plate 68. Regardless, an upper portion (relative to the orientation of FIG. 4) of the central support piece 84 is formed to provide an inner ring 92 and an outer ring 94. The inner ring 92 defines an upper segment of the central passage 90 and forms a tapered bearing surface 96 for assisting in placement of a disk (not shown) onto the planar support device 80. The outer ring 94 similarly extends upwardly relative to the base plate 68, terminating in an outer receiving surface 98. As described below, the outer receiving surface 98 is positioned to selectively receive a portion of a disk (not shown), and thus is preferably located at a diameter acceptable for disk substrate interface. For example, in one preferred embodiment, the outer receiving surface 98 forms a diameter of approximately 1.0–1.3 inches.

As shown in FIG. 4, an annular recess 100 is defined between the inner ring 92 and the outer ring 94. The vacuum ring 86 is disposed within the annular slot 88 so as to extend into the annular recess 100. Further, the central support piece 84 defines a passageway 102 fluidly connecting the annular slot 88 and a vacuum source 103 (FIG. 3). With this configuration, a vacuum can be created within the annular recess 100 upon activation of the vacuum source 103.

In a preferred embodiment, the vacuum ring 86 is comprised of a polymer material, such as rubber. Alternatively, other suitable materials may be employed. The vacuum ring 86 is sized for placement within the annular slot 88 and includes a base 104 and a flange 106. The flange 106 extends in an angular fashion from an upper surface of the base 104, and terminates in an inner receiving surface 108. With this angular configuration, the flange 106 is deflectable relative to the base 104 such that the inner receiving surface 108 is slightly compliant (e.g., generally vertically with respect to the orientation of FIG. 4) upon contact with a disk (not shown). In this regard, during use, a disk placed in contact with the outer receiving surface 98 of the outer ring 94 and the inner receiving surface 108 of the vacuum ring 86 effectively creates a seal therebetween. Thus, a vacuum can be created within the annular recess 100 between the two components, thereby securing the disk to the outer receiving surface 98 and the inner receiving surface 108. Notably, the metal-based outer receiving surface 98 serves as a "hard stop" for the disk, whereas the preferably rubber-based vacuum ring 86 is compliant to allow some deflection of the disk. Further, by extending the flange 106 in an angular fashion away from the outer ring 94, the vacuum area below the disk is thereby maximized. Alternatively, however, the flange 106 may be configured to extend toward the outer ring 94; even further, the vacuum ring 86 may be provided with two or more flanges and therefore two or more receiving surfaces. It should be understood, however, where two or more flanges are provided, the vacuum ring 86 may in fact cause a permanent distortion in the disk and may impede a repeatable "hard stop" from occurring.

Figure 5:
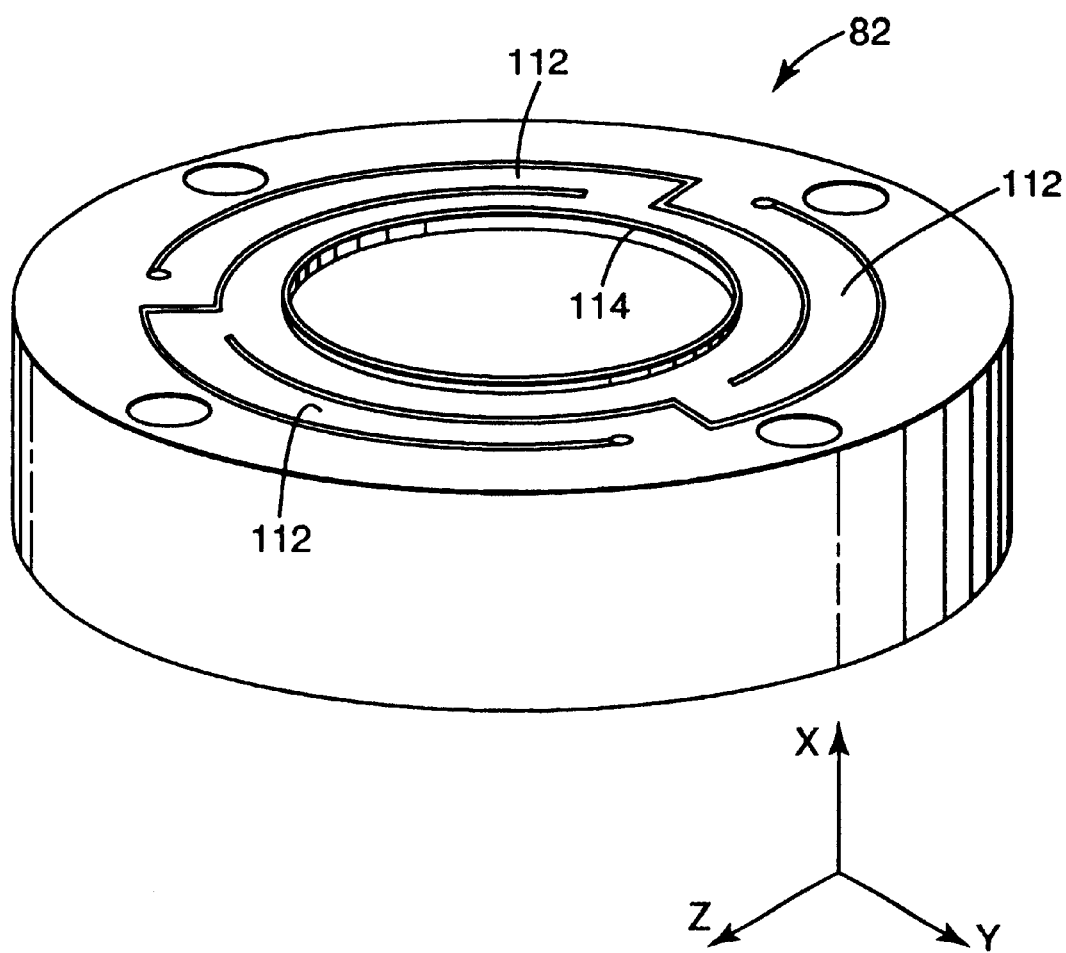
FIG. 5 is a perspective view of disk alignment fixture portion of the disk support assembly.
Figure 6:
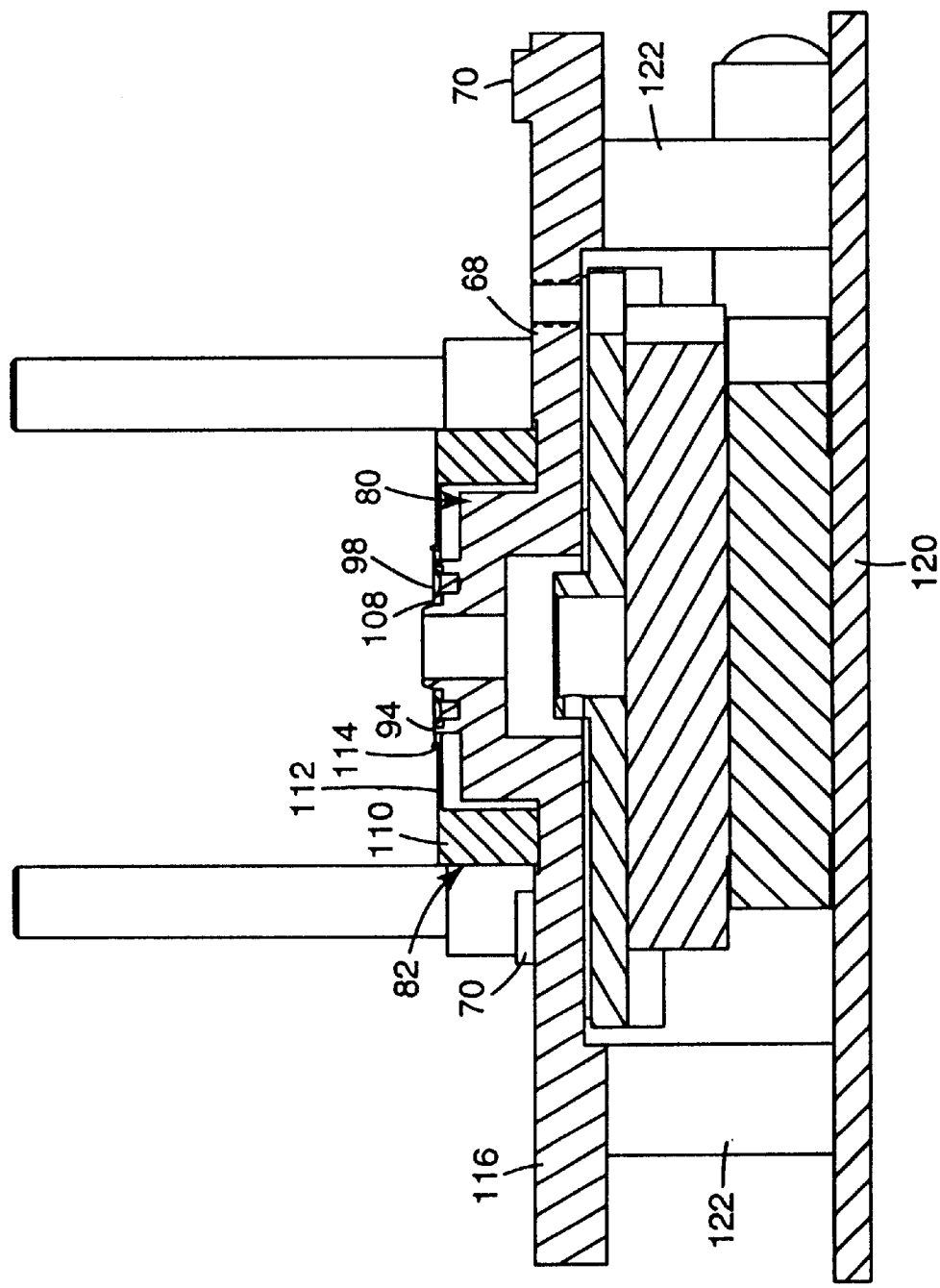
FIG. 6 is a cross-sectional view of the disk support assembly.

The disk alignment fixture 82 is best shown in FIG. 5 and includes a body 110 and arcuate spring fingers 112. The body 110 is sized for placement about the planar support device 80 (FIG. 4) and defines a central lip 114. With reference to FIGS. 5 and 6, the central lip 114 has a diameter greater than a diameter of the outer ring 94 of the planar support device 80, and thus does not interfere with securing of a disk (not shown) to the outer receiving surface 98 and the inner receiving surface 108. The arcuate spring fingers 112 are formed in the body 110 adjacent the central lip 114 and are preferably thin (as best shown in FIG. 5). Further, the arcuate spring, fingers 112 are located such that upon final assembly, the arcuate spring fingers 112 interact with a designated portion of a disk (not shown). More particularly, via this interaction, the arcuate spring fingers 112 guide the disk to a desired horizontal orientation (x-y plane in FIG. 5). Importantly, because the arcuate spring fingers 112 are thin, they can deflect slightly. Thus, the arcuate spring fingers 112, and therefore the disk alignment fixture 82, do not impact or otherwise effect a desired vertical position of the disk (not shown). In other words, the arcuate spring fingers 112 can deflect either upwardly or downwardly, such that the vertical position of the disk is dictated by the outer receiving surface 98 and the inner receiving surface 108 of the planar support device 80.

The base plate 68 is preferably integrally formed with the central support piece 84 as previously described. Thus, the base plate 68 preferably forms a radial extension of the central support piece 84, and is configured to receive the disk alignment fixture 82. Regardless, the base plate 68 is preferably formed of a hardened material, such as steel, such that an extension of the base platen 68 from the central support piece 84 defines a substantially flat upper surface 116 and a substantially flat lower surface 118. A thickness of the base plate 68 between the flat upper surface 116 and the flat lower surface 118 is highly uniform. Thus, due to the substantial rigidity of the base plate 68, extension of the planar support device 80 is to a known level relative to the upper surface 116 and the lower surface 118. In other words, the outer receiving surface 98 and the inner receiving surface 108 of the planar support device 80 extends to a known horizontal position relative to the upper surface 116 and the lower surface 118. With this in mind, the base plate 68 may be secured to a ground structure 120 via supports 122. So long as the ground structure 120 and the supports 122 are substantially rigid and machined to a known height, the base plate 68, and thus the planar support device 80, will be positioned at a known horizontal location relative to the ground structure 120.

Finally, with reference to FIGS. 3 and 6, the standoffs 70 extend upwardly from the flat upper surface 116 of the base plate 68. The standoffs 70 are preferably formed from a hardened material, for example stainless steel, and may or may not be integral with the base plate 68. In one preferred embodiment, three of the standoffs 70 are provided, although any other number is equally acceptable. Additionally, the standoffs 70 are preferably positioned apart from the planar support device 80 and the disk alignment fixture 82 by a distance sufficient so as to not interfere with placement of a disk (not shown). Finally, the standoffs 70 are preferably equidistant. In one preferred embodiment, each of the standoffs 70 have an identical extension from the upper surface 116 of the base plate 68, for example approximately 0.2 inch, although other dimensions are equally acceptable. Upon final assembly, then, due to the rigidity of the planar support device 80, the base plate 68 and the standoffs 70, the horizontal plane defined by the outer receiving surface 98 of the outer ring 94 has a known relationship to the extension of the standoffs 70.

D. Hub Placement Assembly 64

Figure 7:
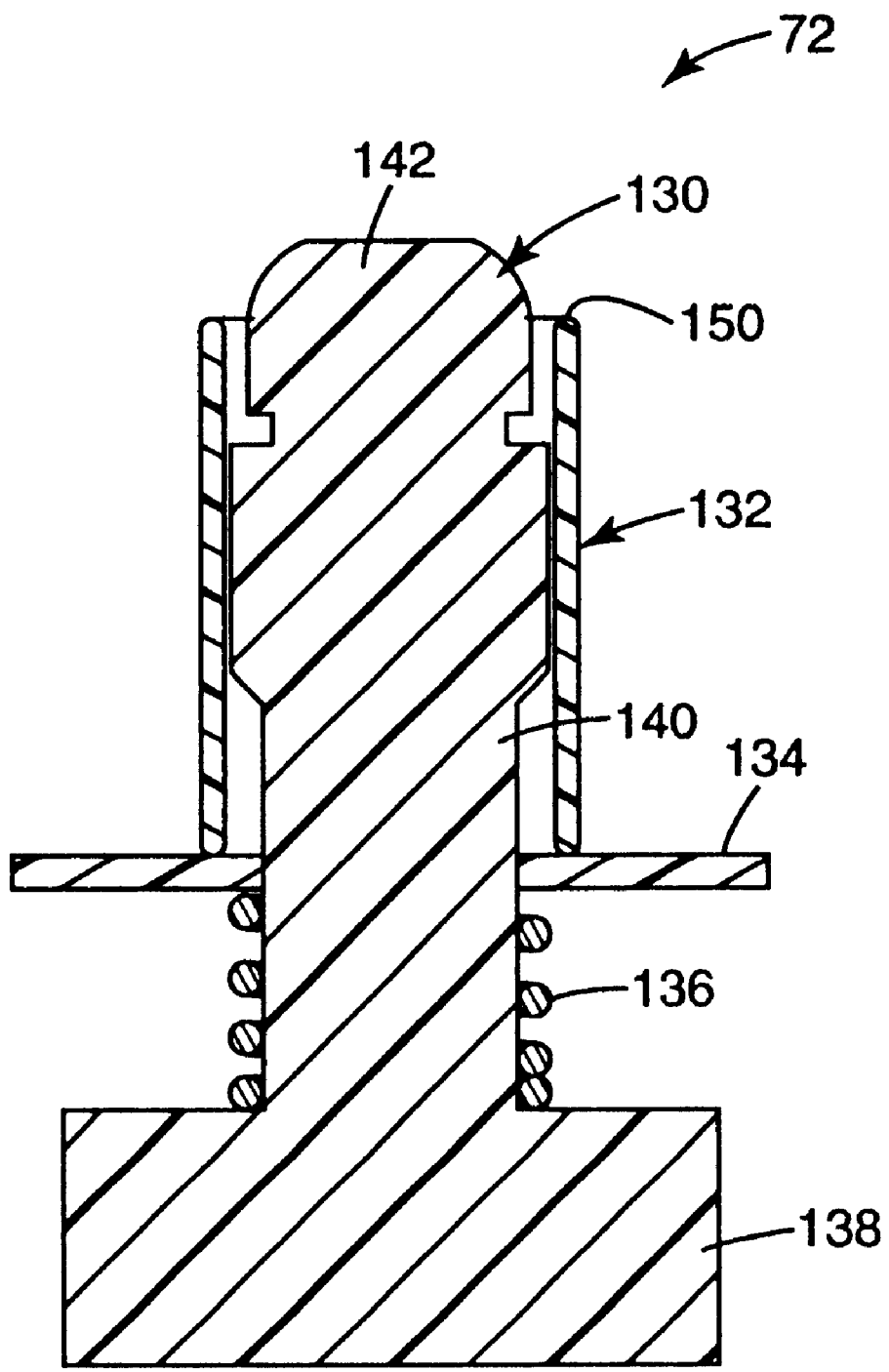
FIG. 7 is cross-sectional view of a portion of the hubbing apparatus of FIG. 2.

As previously described, and with reference to FIG. 2, the hub placement assembly 64 includes the compliant hub support 72, the press plate 74 and the extension arms 76. The compliant hub support 72 is shown in greater detail in FIG. 7. The compliant hub support 72 includes a center dowel 130, a pusher sleeve 132, a washer 134 and a spring 136. The pusher sleeve 132, the washer 134 and the spring 136 are co-axially disposed about the center dowel 130 as shown in FIG. 7. With this orientation, the spring 136 biases the washer 134 into contact with the pusher sleeve 132. This biasing action directs the pusher sleeve 132 upwardly along the center dowel 130.

The center dowel 130 includes a base 138, a shaft 140 and a head 142. In one preferred embodiment, the base 138, the shaft 140, and the head 142 are integrally formed from a rigid material such as stainless steel. The base 138 is preferably configured to have a width greater than a width of the shaft 140. For example, in one preferred embodiment, the base 138 is circular, having a diameter of approximately 0.7 inch, whereas the shaft 140 has a diameter of approximately 0.3 inch. With this relationship, the base 138 prevents the various other components of the compliant hub support 72 from disengaging the shaft 140.

Figure 8:
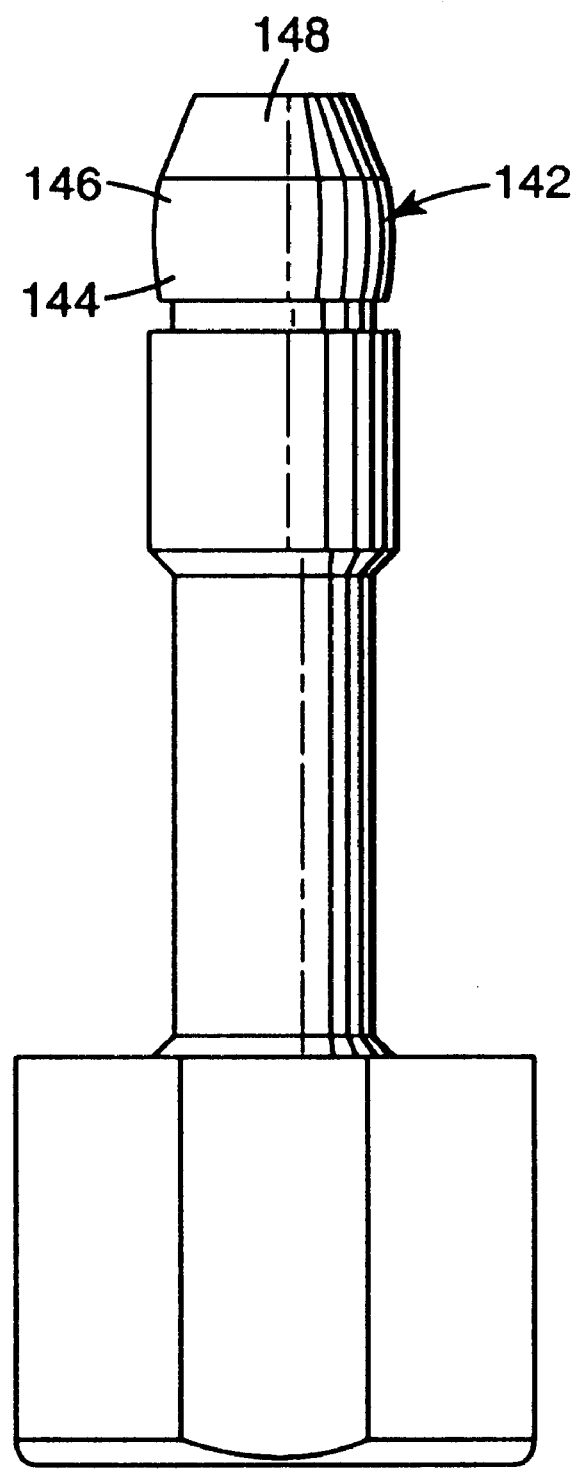
FIG. 8 is a side view of a center dowel.

As shown in greater detail in FIG. 8, the head 142 is defined by a trailing section 144, an intermediate section 146 and a leading section 148. The trailing section 144 and the intermediate section 146 combine to define an arcuate shaped wall. In other words, the trailing section 144 increases in diameter to the intermediate section 146. The intermediate section 146, conversely, decreases in diameter to the leading section 148. This rounded shape facilitates unconstrained positioning of a hub (shown with dashed lines), as described below. Finally, the leading section 148 tapers in diameter from the intermediate section 146. For example, in one preferred embodiment, a taper of the leading section 148 forms an included angle of approximately 140 degree.

Returning to FIG. 7, the pusher sleeve 132 is tubular in form, configured to be co-axially disposed over the center dowel 130, and in particular the shaft 140 and the head 142. In one preferred embodiment, the pusher sleeve 132 is manufactured from a hardened material such as stainless steel, having an outer diameter of 0.375 inch and a 20 gauge wall thickness. Further, in one preferred embodiment, the pusher sleeve 132 has a height of approximately 0.68 inch. Finally, to facilitate compliant interaction with a hub (not shown), a leading end 150 of the pusher sleeve 132 is preferably rounded.

The washer 134 is preferably made from a rigid material such as stainless steel and is sized for placement over the shaft 140. More particularly, the washer 134 is sized to be slidable along the shaft 140. Thus, in one preferred embodiment, the washer 134 has an inner diameter of approximately 0.2 inch. Notably, as shown in FIG. 7, the washer 134 interacts with the pusher sleeve 132. Thus, the inner diameter of the washer 134 is less than an inner diameter of the pusher sleeve 132.

The spring 136 is preferably a helical compression spring sized for placement between the washer 134 and the base 138. As shown in FIG. 7, the spring 136 is sized for placement about the shaft 140, having an outer diameter greater than an inner diameter of the washer 134.

The compliant hub support 72 is assembled substantially as follows. The spring 136 is co-axially disposed about the center dowel 130 such that an end of the spring 136 abuts the base 138. The washer 134 is similarly co-axially received over the shaft 140 and placed in contact with an opposing end of the spring 136. The pusher sleeve 132, in turn, is co-axially received over the center dowel 130 and is in contact with the washer 134. With this configuration, the spring 136 biases the washer 134 and thus the pusher sleeve 132 upwardly (relative to the orientation of FIG. 7). During use, a hub (not shown) is directed into engagement with the leading end 150 of the pusher sleeve 132. A downward force placed on the hub overcomes the bias provided by the spring 136 such that the hub is directed into contact the head 142. Due to the preferred rounded configuration of the head 142, the head 142 does not dictate a specific three-dimensional orientation of the hub. Instead, as described in greater detail below, the hub essentially "floats" on the head 142 and can be directed to a desired three-dimensional position and orientation by a separate component. As described below, these constant "upward" force provided by the compliant hub support 72 eliminates problems caused by a capillary force presented by adhesive during a hubbing procedure.

Figure 9A:
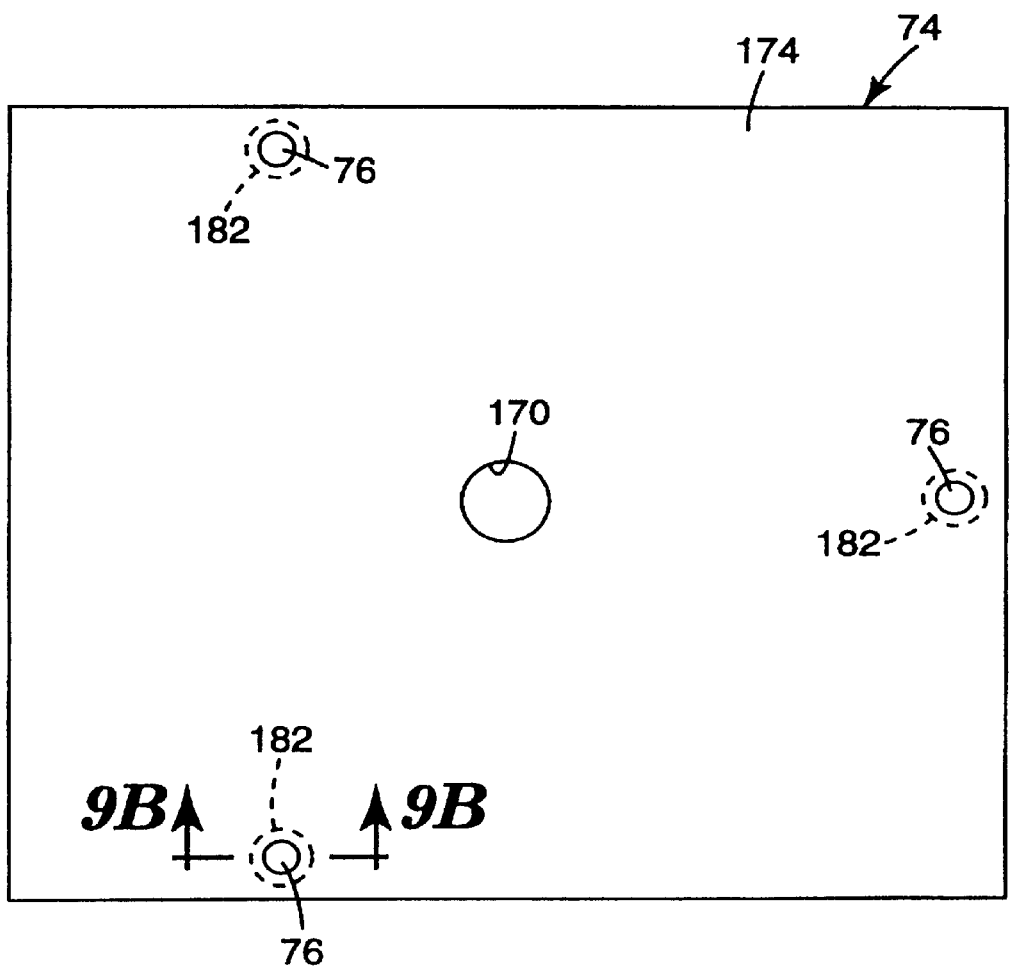
FIG. 9A is a top view of a press plate portion of the hubbing apparatus.
Figure 9B:
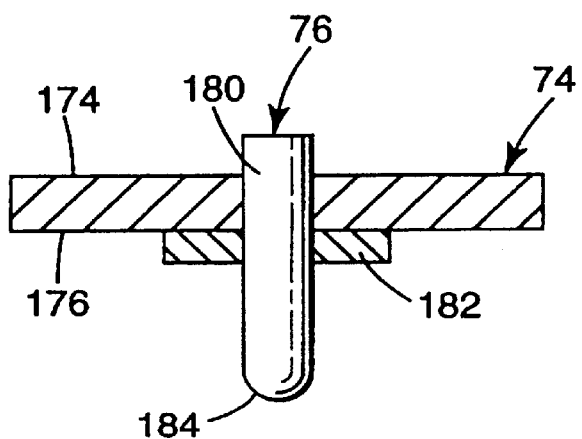
FIG. 9B is a cross-sectional view along the line 9B—9B of FIG. 9A.

The press plate 74 and extension alms 76 are shown in greater detail in FIGS. 9A and 9B. The press plate 74 is preferably formed from a solid, ultraviolet (UV) transmissive material such as quartz. As described below, the UV transmissive characteristic of the press plate 74 facilitates transmission of ultraviolet rays through the press plate 74 to effectuate curing of an adhesive. The press plate 74 forms a central aperture 170, and a plurality of arm receiving passages 172. The central aperture 170 is sized to allow passage of a portion of a hub (not shown) and in one preferred embodiment has a diameter of approximately 0.75 inch. The arm receiving passages 172 are sized to receive and maintain a respective one of the extension arms 76. Where quartz glass is selected for the press plate 74, in one preferred embodiment the press plate 74 has a thickness of approximately 0.5 inch. Regardless, the press plate 74 defines an outer surface 174 and an inner surface 176 (FIG. 9B) and has a known, uniform thickness. Finally, while the press plate 74 is shown in FIG. 9A as being square, other shapes, such as circular, are equally acceptable.

Each of the extension arms 76 are secured to the press plate 74. One such assembly is shown, for example, in FIG. 9B. As a point of reference, only one of the extension arms 76 is shown in FIG. 8B, it being understood that the other extension arms 76 are similarly configured. With this in mind, the extension arm 76 includes a shaft 180 and a control dial 182. The shaft 180 is secured to the press plate 74 and includes a tip 184 extending below the inner surface 176 of the press plate 74. In one preferred embodiment, the extension arm 76 is a modified micrometer, whereby the control dial 182 dictates a known extension of the tip 184 relative to the inner surface 176 of the press plate 74. Rotation of the control dial 182 effectuates extension or retraction of the tip 184 relative to the inner surface 174. Thus, by providing the control dial 182 with calibrated, circumferential indicia (not shown), a user can maneuver the control dial 182 so as to accurately position the tip 184 relative to the inner surface 176. Notably, because the press plate 74 has a known thickness, the known position of the tip 184 relative to the inner surface 176 corresponds with a known position of the tip 184 relative to the outer surface 174.

With reference to FIGS. 9A and 9B, each of the extension arms 76 are similarly configured and therefore preferably provide for independent positioning of each of the tips 184, respectively, relative to the press plate 74. In one preferred embodiment, three of the extension arms 76 are provided, equidistantly positioned about the central aperture 170. As will be made more clear below, the extension arms 76 are spaced from the central aperture 170 so as to not interfere with attachment of a hub to a disk. Thus, in one preferred embodiment, the extension arms 76 are spaced approximately 120 degrees from one another, and at least 3 inches away from a center of the central aperture 170. Importantly, the extension arms 76 are located in correspondence with locations of the standoffs 70 (FIG. 3) associated with the base plate 68 (FIG. 3).

E. Assembly Of The Hubbing Apparatus 60

Figure 10:
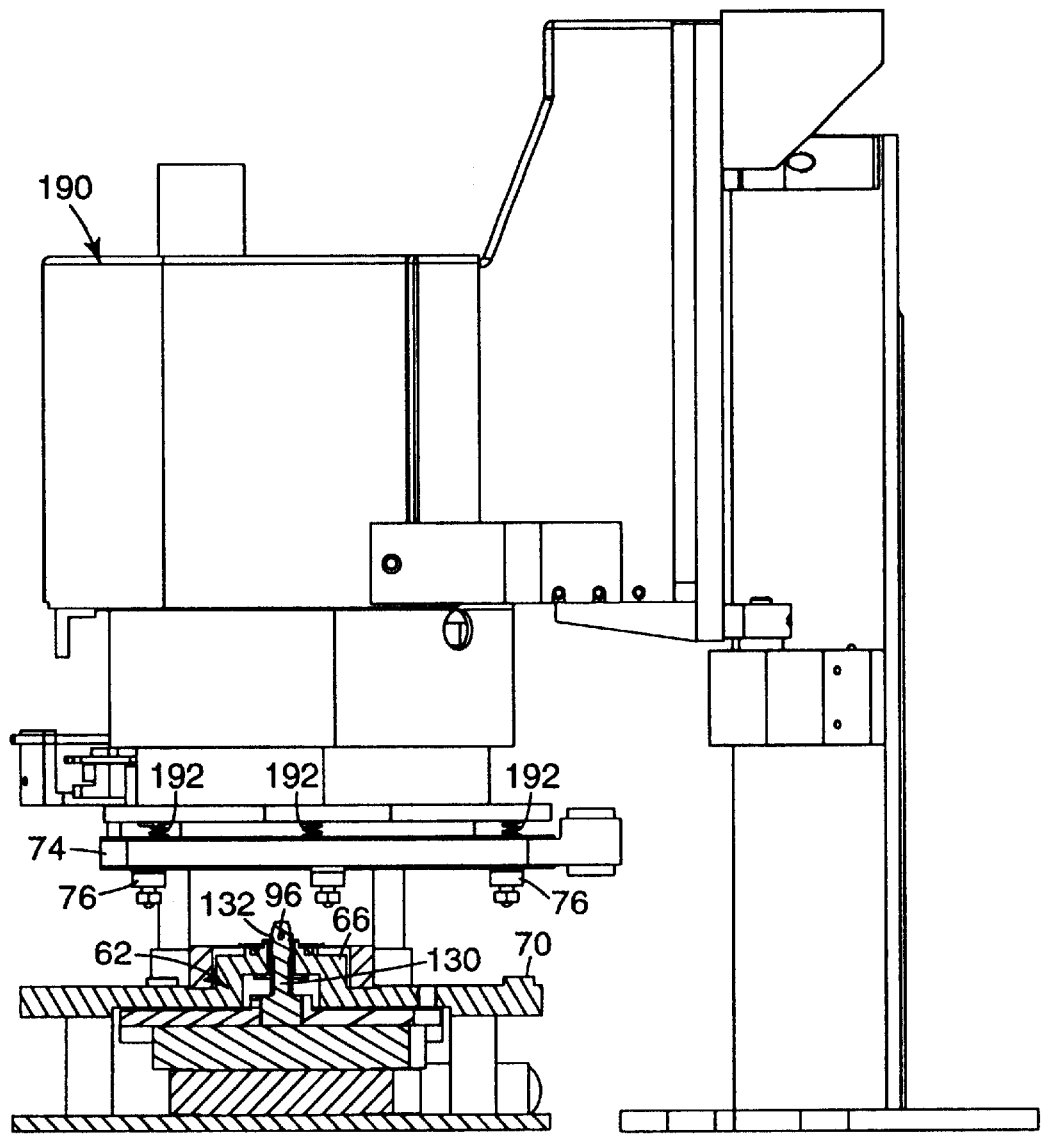
FIG. 10 is a side view of a hubbing apparatus in accordance with the present invention.

Assembly of one preferred embodiment of the hubbing apparatus 60 is shown in FIG. 10. The extension arms 76 are secured to the press plate 74. The press plate 74, in turn, is secured to a vertically articulable apparatus 190. The apparatus 190 can assume a wide variety of forms and is generally configured to controllably maneuver the press plate 74 vertically. In one preferred embodiment, the press plate 74 is secured to the apparatus 190 by springs 192. The springs 192 provide a slight compliancy to movement of the press plate 74 relative to the apparatus 190.

The apparatus 190 is associated with the disk support assembly 62 such that the press plate 74 is centered above the disk support fixture 66. Further, each of the extension arms 76 are positioned above one of the standoffs 70, respectively. The compliant hub support 72 is assembled as previously described and is centrally positioned relative to the disk support assembly 62. More particularly, the central dowel 130 and the pusher sleeve 132 extend through a center of the disk support fixture 66 as shown. With this configuration, vertical movement of the press plate 74 toward the disk support assembly 62 continues until the extension arms 76 contact the standoffs 70, respectively. In this position, the central dowel 130 extends through the central aperture 170 (FIG. 9A) in the press plate 74.

F. Hubbing Procedure

Figure 11:
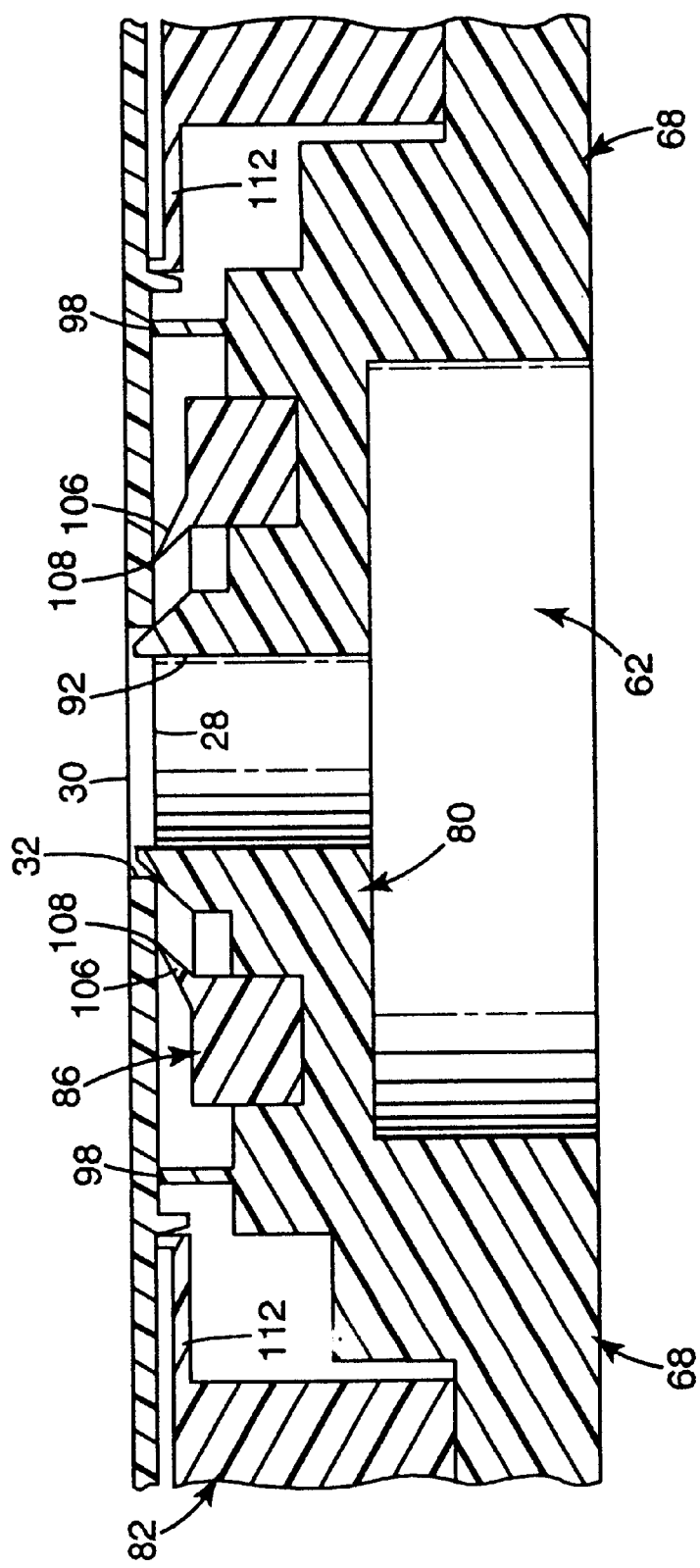
FIG. 11 is a cross-sectional view of a disk substrate maintained by a disk support assembly.

Use of the hubbing apparatus 60 to assemble a hub to an optical disk begins with placement of the optical disk 22 onto the disk support assembly 62 as shown in FIG. 11. As a point of reference, FIG. 11 depicts only a portion of the hubbing apparatus 60 (FIG. 9) for purposes of clarity and does not show the compliant hub support 72. It will be understood, however, that the hubbing apparatus 60 typically is fully assembled prior to a hubbing procedure. The central hole 32 of the optical disk 22 is axially disposed about the inner ring 92 of the planar support device 80. The arcuate spring fingers 112 of the disk alignment fixture 82 engage an alignment feature formed on the first major surface 28 of the optical disk 22, thereby aligning the optical disk 22 in a preferred x-y position. Further, the first major surface 28 of the optical disk 22 contacts the flange 106 of the vacuum ring 86 and the outer receiving surface 98 of the planar support device 80. A vacuum source (not shown) is activated, thereby affixing the first major surface 28 the optical disk 22 to the planar support device 80 at a defined position and orientation. Notably, because the outer receiving surface 98 and the inner receiving surface 108 are relatively small and spaced, vertical orientation of the optical disk 22 is largely independent of any incidental abnormalities in the first major surface 28 of the optical disk 22. To this end, the flange 106 of the vacuum ring 86 is preferably deflectable, providing further compliancy for potential abnormalities in the first major surface 28. Further, abnormalities in the second major surface 30 of the optical disk 22 do not affect positioning and orientation of the optical disk 22. Generally speaking, a vacuum in the range of 20 inches Hg is sufficient to secure the optical disk 22 to the planar support device 80. Following activation of the vacuum source, the first major surface 28 of the optical disk 22 is positioned at a known three-dimensional position and orientation.

Figure 12:
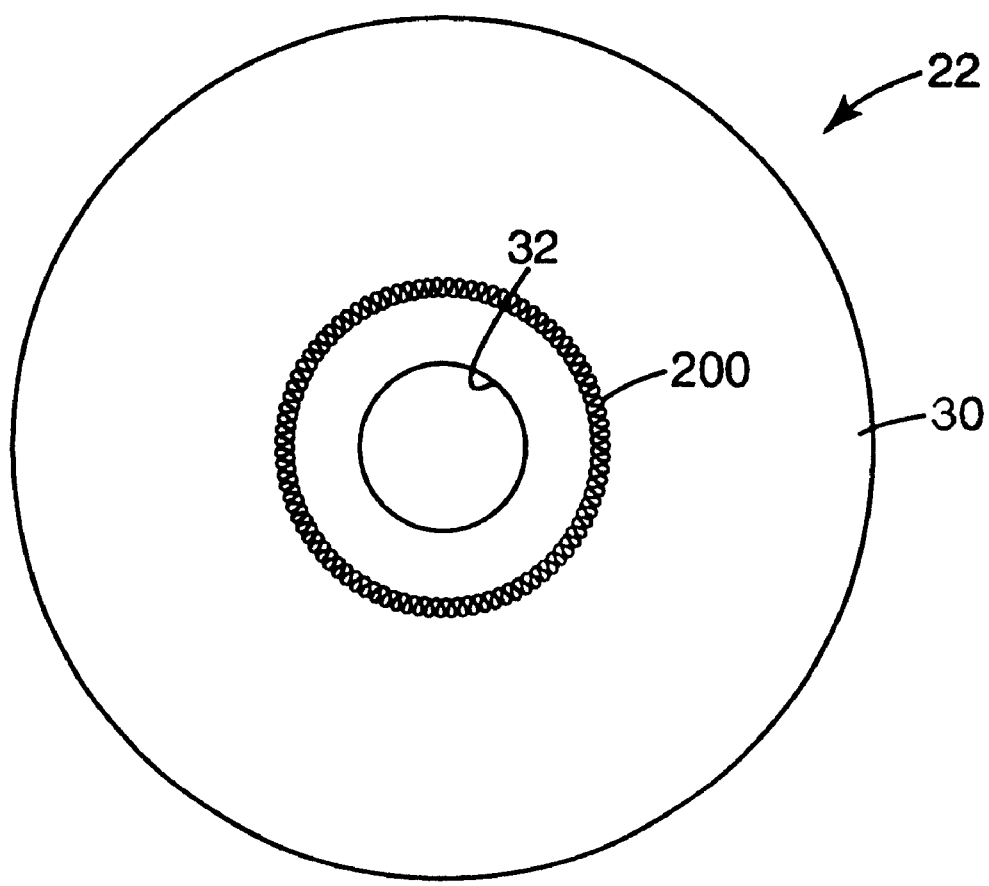
FIG. 12 is a top view of a disk substrate predisposed with a glue bead.

In one preferred embodiment, prior to placement of the optical disk 22 onto the disk support assembly 62 is an adhesive, preferably, a bead of glue 200 is dispensed or otherwise predisposed onto the second major surface 30 of the optical disk 22 as shown in FIG. 12. The adhesive 200 is preferably a UV curable glue, such as UV curable acrylate. Alternatively, other adhesives may also be useful. The adhesive 200 can be dispensed with a number of different devices, but preferably encircles the central hole 32 and is slightly deformable in an uncured state. That is to say, the adhesive 200 maintains the beaded shape shown in FIG. 12, but can be at least partially displaced (such as with a hub) in the uncured state. Notably, the adhesive 200 is not necessarily predisposed, but can instead be applied following affixing of the optical disk 22 to the disk support assembly 62.

Figure 13:
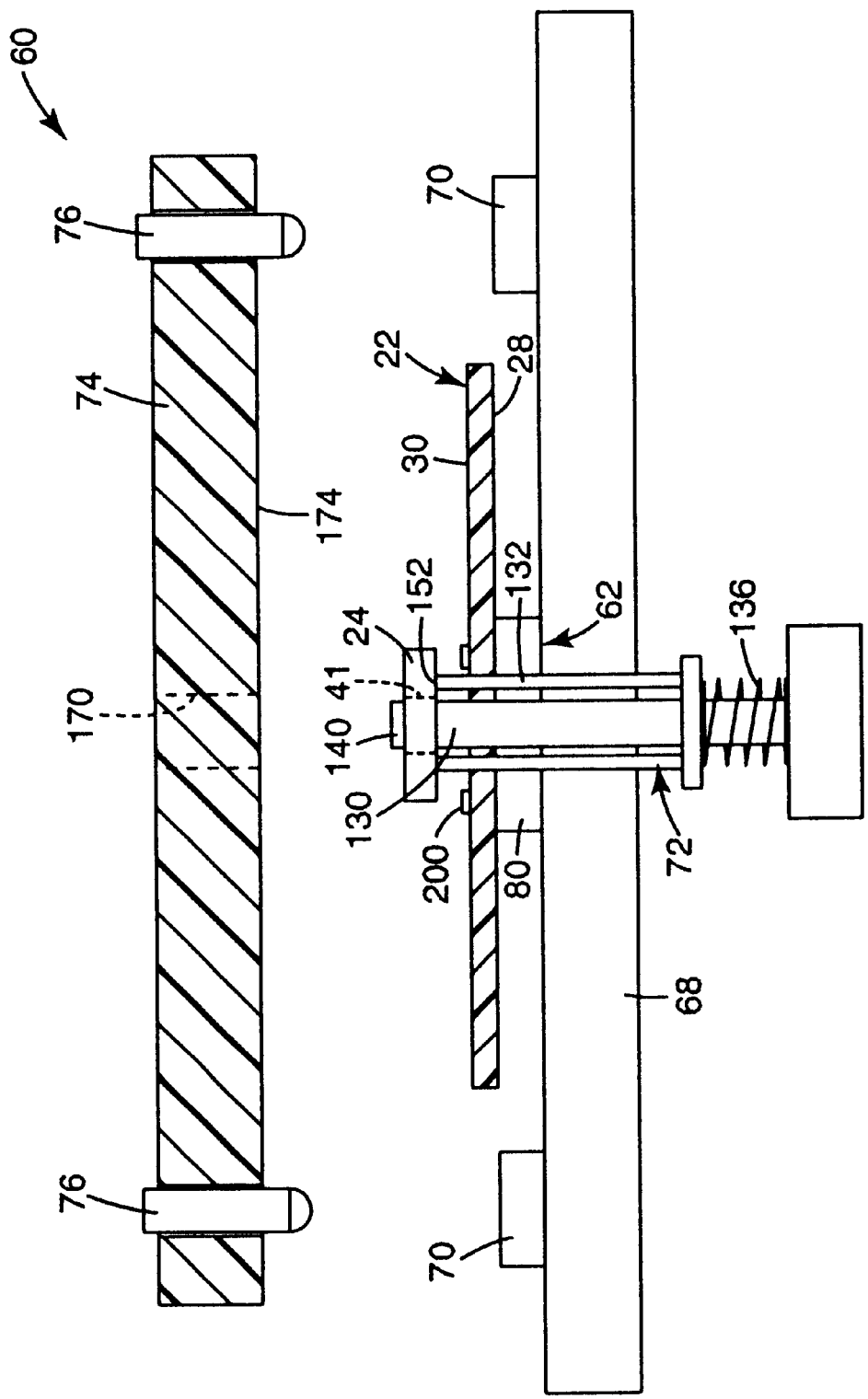
FIGS. 13 and 14 illustrate assembly of a hub to an optical disk in accordance with the present invention.

The hub 24 is then placed onto the pusher sleeve 132 as shown in FIG. 13. Unlike previous hubbing devices, the hub 24 is supported at least in part, along the inner surface 46. The spring 136 initially biases the pusher sleeve 132 such that the leading portion 152 extends above the second major surface 30 of the optical disk 22. Thus, the hub 24 is similarly disposed above the optical disk 22, and thus not in contact with the adhesive 200. Further, the center dowel 130 is sized to have a diameter less than a diameter of the central bore 44 of the hub 24 and of the pusher sleeve 132. The head 140 serves as a guide for hub placement. As previously described, the head 140 is rounded so as to not constrain the hub 24 to a particular three-dimensional position or orientation. Thus, the hub 24 effectively "floats" above the optical disk 22 and is movable to a number of different three-dimensional positions and orientations. In this regard, because the pusher sleeve 132 has a diameter greater than that of the center dowel 130, and because the pusher sleeve 132 is preferably independent of the washer 134, the pusher sleeve 132 can likewise "tilt" relative to an axis of the center dowel 130.

With the hub 24 in contact with the pusher sleeve 132, the press plate 74 is moved downwardly, toward the hub 24 and the optical disk 22. During this downward motion, the press plate 74 contacts the hub 24. The press plate 74 contacts the hub 24 along the inner surface 174 at the central aperture 170. Because the hub 24 is bowed or crowned, the central aperture 170 allows the hub 24 to freely move to a desired orientation. Downward motion of the press plate 74 continues, with the downward force of the press plate 74 being sufficient to overcome the bias of the spring 136. To this end, springs or a separate weight may be included to provide a consistent downward force. Regardless, the hub 24 is directed toward the second major surface 30 of the optical disk 22.

Figure 14:
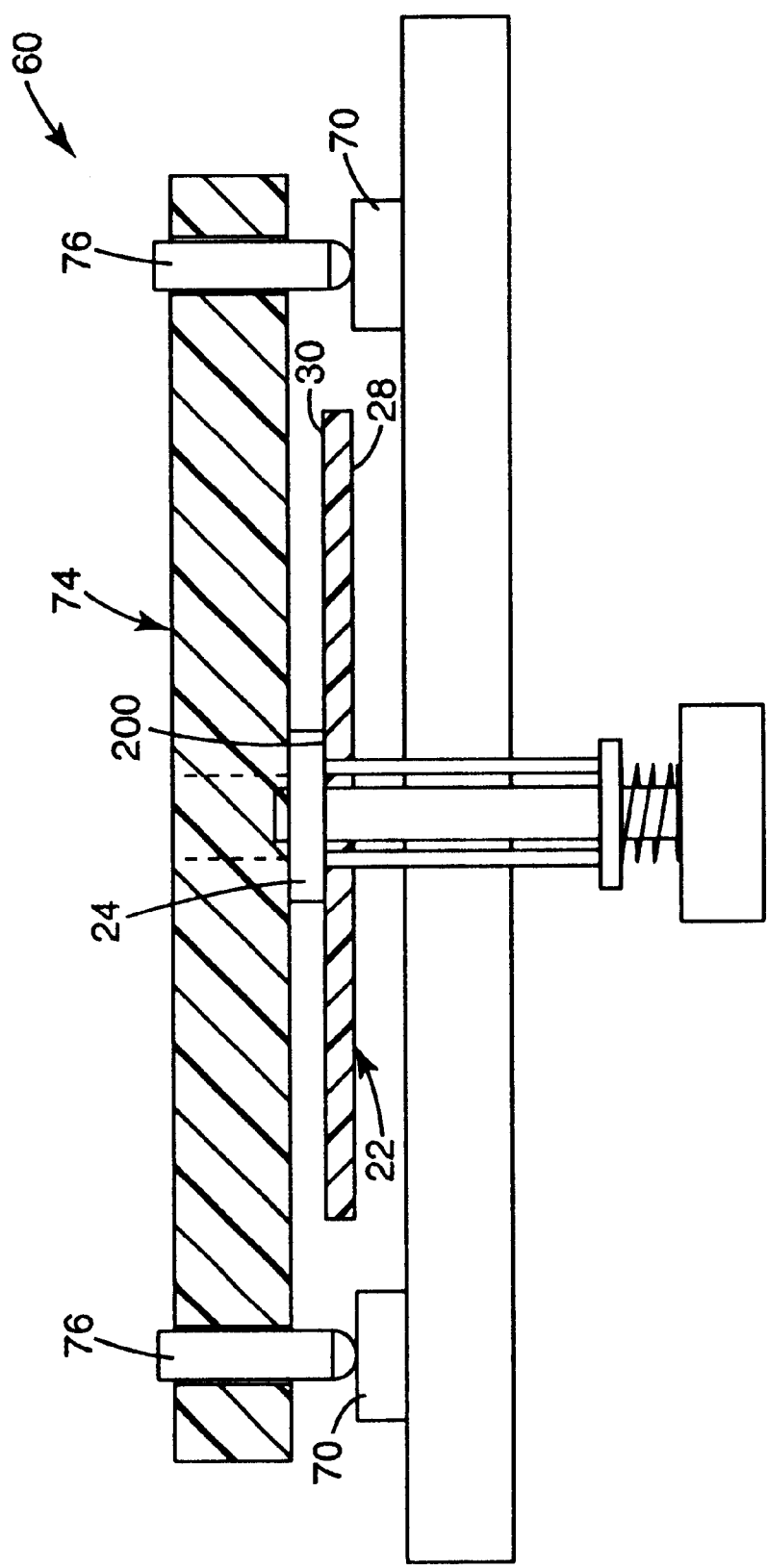

Downward motion of the press plate 74, and thus of the hub 24, continues until the extension arms 76 contact the standoffs 70, thereby preventing further downward movement of the press plate 74. As shown in FIG. 14, the hubbing apparatus 60 is in a mounting position whereby the hub 24 is in contact with the adhesive 200. The adhesive 200 is then cured, such as by transmission of ultraviolet rays through the press plate 74 which, in a preferred embodiment, is a UV transmissible material, such as quartz. Following curing of the adhesive 200, the press plate 74 is retracted, and the assembled optical disk 22/hub 24 removed.

Notably, with reference to FIG. 13, the hubbing apparatus 60 of the present invention positions and orientates the hub 24 in a three-dimensional position and orientation based solely upon the defined position and orientation of the first major surface 28, normally containing data of the optical disk 22. The optical disk 22 is secured to the disk support assembly 62 via the planar support device 80. In particular, the outer receiving surface 98 of the planar support device 80, in conjunction with the disk alignment fixture 82 (FIG. 5) dictates a known three-dimensional position and orientation of the first major surface 28 of the optical disk 22. The three-dimensional position and orientation of the outer receiving surface 98 is known and is transferred through the planar support device 80 and the base plate 68 to the standoffs 70. Once again, the base plate 68 and the standoffs 70 are formed from a rigid material having known dimensions. Thus, extension of the standoffs 70 from the base plate 68 bears a known, consistent relationship relative to the outer receiving surface 98, and thus the first major surface 28 of the optical disk 22. This known position is then transferred through the extension arms 76 to the press plate 74. The press plate 74, in turn, dictates a final, three-dimensional position and orientation of the hub 24. In other words, the planarity and final vertical position of the press plate 74 is based solely upon the disk support assembly 62, and in turn is imparted directly to the hub 24. Notably, the compliant hub support 72 does not impede the hub placement assembly 64 from achieving this desired three-dimensional position and orientation of the hub 24. Further, due to the deformable nature of the adhesive 200, the hub 24 can be orientated to the desired, three-dimensional position and orientation. That is to say, the adhesive 200 does not rigidly restrict the hub 24 to a particular position or orientation.

Figure 15:
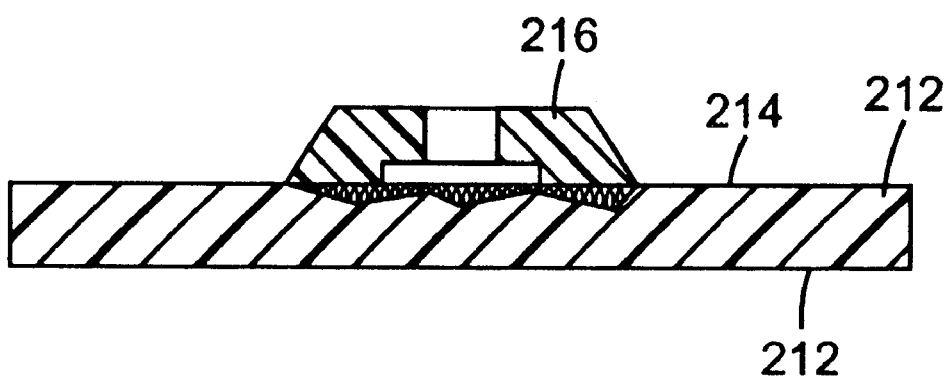
FIG. 15 is an enlarged, cross-sectional view of an alternative example of a hub assembled to a disk.

By eliminating virtually all tolerance concerns from the assembly process, the hubbing apparatus 60 of the present invention accounts for abnormalities or deviations in the optical disk 22. For example, an optical disk 210 is depicted in FIG. 15 having a first major surface 212 and a second major surface 214 that are non-planar. With currently available technology, a hub 216 would be directly secured to the second major surface 214, irrespective of the non-planar conditions. The resulting assembly would experience mechanical runouts in that the hub 216 would be unaligned relative to the first major surface 212. The hubbing apparatus 60 of the present invention, however, eliminates this non-planarity when assembling the hub 216 to the optical disk 210. More particularly, and as shown in FIG. 15, the hubbing apparatus 60 effectively allows the hub 216 to "float" relative to the optical disk 210. During assembly, the hub 216 is positioned and orientated relative to the adhesive 200 based solely upon a known positioned and orientation of the first major surface 212. Due to the deformable nature of the adhesive 200, the hub 216 can be maintained in the desired three-dimensional positioned orientation, independent of the deviations in the second major surface 214. Further, a capillary force potentially presented by the adhesive 200 will not affect hub placement and orientation due to the upward bias of the compliant hub support 72 (FIG. 2). That is to say, the compliant hub support 72 prevents a capillary force of the adhesive 200 from pulling the hub 216 into an undesired orientation during assembly.

As previously described, and with reference to FIGS. 9A and 9B, each of the extension arms 76 can be independently maneuvered to a desired extension from the press plate 74. With this approach, orientation of the press plate 74 in the final, mounting position and orientation can be accurately defined relative to determined errors in location of the optical disk 22 (FIG. 14). As a point of reference, optical disk substrates are normally mass produced (e.g., molded) in lots. As a result, each of the optical disks comprising a particular lot will have the same planarity deviations. Thus, during mass hubbing, it is possible to "correct" hubbing assembly errors within a particular lot. For example, a first optical disk assembly can be generated (e.g., hub secured to disk substrate) as previously described. Following construction, the optical disk assembly is then tested for mechanical runout problems. In other words, even with the improved hubbing apparatus of the present invention, it is still possible for deviations in hub-to-disk surface alignment to occur. Based upon the results of the testing, a determination can be made as to the errors, if any, in placement of the hub. Based upon these error calculations, one or more of the extension arms 76 can be vertically moved relative to the inner surface 174 of the press plate 74, thereby correcting hub placement deviations. For example, a worksheet or table can be generated to provide correction values for each of the extension arms based upon axial runout tests. For example, axial runout can be defined by a "wobble" of the optical disk assembly during rotation thereof. Generally speaking, a side view of an imperfectly formed optical disk assembly will visually highlight a vertical wobble during rotation thereof. Because the optical disk is circular, the minimum "wobble" point can be plotted at a particular radial location. This plotting is normally facilitated by the fact that each optical disk substrate formed in a particular lot will have a small gate marking formed at an identical radial location. This gate marking serves as a reference point for plotting wobble locations. With this in mind, the following table has been generated to provide correction multiplier values for a hub placement assembly 64 including three equidistantly positioned extension arms 76, whereby a standard correction of 1.640 micrometers is assumed.

| Low Point Wobble (In Degrees) | Multiplier For Extension Arm No. 1 | Multiplier For Extension Arm No. 2 | Multiplier For Extension Arm No. 3 |
| --- | --- | --- | --- |
| 330 | 1.0000 | None | 0.0000 |
| 340 | 0.9167 | None | 0.0833 |
| 350 | 0.6333 | None | 0.1667 |
| 0 | 0.7500 | None | 0.2500 |
| 10 | 0.6667 | None | 0.3333 |
| 20 | 0.5833 | None | 0.4167 |
| 30 | 0.5000 | None | 0.5000 |
| 40 | 0.4167 | None | 0.5833 |
| 50 | 0.3333 | None | 0.6667 |
| 60 | 0.2500 | None | 0.7500 |
| 70 | 0.1667 | None | 0.8333 |
| 80 | 0.0833 | None | 0.9157 |
| 90 | 0.0000 | 0.0000 | 1.0000 |
| 100 | None | 0.0833 | 0.9167 |
| 110 | None | 0.1667 | 0.8333 |
| 120 | None | 0.2500 | 0.7500 |
| 130 | None | 0.3333 | 0.6667 |
| 140 | None | 0.4167 | 0.5833 |
| 150 | None | 0.5000 | 0.5000 |
| 160 | None | 0.5833 | 0.4167 |
| 170 | None | 0.6667 | 0.3333 |
| 180 | None | 0.7500 | 0.2500 |
| 190 | None | 0.8333 | 0.1667 |
| 200 | None | 0.9167 | 0.0833 |
| 210 | None | 1.0000 | 0.0000 |
| 220 | 0.0633 | 0.9167 | None |
| 230 | 0.1667 | 0.8333 | None |
| 240 | 0.2500 | 0.7500 | None |
| 250 | 0.3333 | 0.6667 | None |
| 260 | 0.4167 | 0.5833 | None |
| 270 | 0.5000 | 0.5000 | None |
| 280 | 0.5833 | 0.4167 | None |
| 290 | 0.6667 | 0.3333 | None |
| 300 | 0.7500 | 0.2500 | None |
| 310 | 0.8333 | 0.1667 | None |
| 320 | 0.9167 | 0.0833 | None |
| 330 | 1.0000 | 0.0000 | None |

Based upon the above table, corrections in hub placement can be made for subsequent assembly of hubs to disks for a particular lot of optical disk substrates. A more complete "adjustment" can be made where, in addition to the multiplier value from the above table, a correction factor related to a maximum allowable axial run-out of the disk assembly is also incorporated. The resulting correction calculation may then be based upon [(multiplier from table)×(AR/2)× 1.640 micrometers]. For example, following assembly of a first optical disk assembly, it may be determined that the low wobble point occurs at a disk location of 150 degrees relative to the gate marking. The particular hub assembly has, for example, a maximum allowable axial nm-out (AR) of 100. Based upon the above table, then, the first extension arm 76 is not altered, the second extension arm is retracted 41 micrometers (e.g., 0.5000×1.640 micrometers×AR/2). Similarly, the third extension arm is retracted 41 micrometers (e.g., 0.5000×1.640 micrometers×AR/2). Thus, so long as each subsequent disk is consistently placed onto the disk support assembly 62 at a known rotational position (e.g., based upon the gate marking), any errors found in the first optical disk assembly will not be repeated. Obviously, other techniques may be employed to facilitate corrections, if any, to positions of the extension arm(s).

The hubbing apparatus of the present invention provides a marked improvement over previous designs. The hubbing apparatus removes virtually all tolerance deviations from the hubbing process, consistently positioning the hub at a three-dimensional orientation based upon a known three-dimensional orientation of the data surface (or first major surface) of the optical disk. Further, by providing movable extension arms, any unforseen errors can be eliminated during mass production. Finally, the hubbing apparatus of the present invention does not rely upon optics or similar technology. Therefore, the hubbing apparatus is highly inexpensive.

Although the present invention has been described with reference to preferred embodiments, workers skilled in the art will recognize that changes may be made in form and detail without departing from the spirit and scope of the invention. For example, various components of the hubbing apparatus have been described with reference to preferred dimensional attributes. Depending upon the size and type of the optical disk substrate and/or hub, the preferred dimensions can be altered.

What is claimed is:

1. A method of assembling a hub to an optical disk with an adhesive, the optical disk having first and second major surfaces and a central opening, the adhesive being predisposed onto the second major surface for adhering the hub, the method including:

supporting the first major surface of the disk at a defined three-dimensional position and orientation;

aligning the hub above the central opening of the disk with a hub placement assembly such that the hub is movable to a plurality of three-dimensional positions and orientations, the hub placement device supporting an inner portion of the hub;

transferring the defined three-dimensional position and orientation of the first major surface to the hub placement device; and maneuvering the hub into contact with the adhesive on the second major surface of the disk, wherein a final three-dimensional position and orientation of the hub is dictated by the hub placement assembly as a function of the defined three-dimensional position and orientation of the first major surface of the disk, whereby the hub is parallel to the first major surface of the disk.

2. The method of claim 1, wherein the adhesive is curable glue, the method further including:

curing the glue to affix the hub to the disk.

3. The method of claim 2, wherein the hub placement assembly includes an ultra violet transmissive press plate for directing the hub downwardly into contact with the glue, and wherein curing the glue includes:

transmitting ultra violet rays through the press plate.

4. The method of claim 2, wherein prior to curing, the glue is deformable, and wherein maneuvering the hub into contact with the glue includes:

displacing a portion of the glue such that following curing, the glue has a varying thickness.

5. The method of claim 1, further including:

providing a hub placement assembly including a compliant hub support for biasing the hub above the disk and a press plate for selectively engaging the hub and directing the hub into contact with the glue.

6. The method of claim 5, wherein maneuvering the hub into contact with the glue includes guiding the press plate toward the disk with a force sufficient to overcome a bias of the compliant hub support.

7. The method of claim 6, wherein the disk is supported by a disk support assembly having at least one standoff extending substantially perpendicular to the first and second major surfaces, the standoff being spaced from the disk, and wherein the hub placement assembly includes at least one arm extending from the press plate toward the disk support assembly, the at least one arm being aligned with the at least one standoff, and further wherein guiding the press plate includes:

directing the press plate toward the disk such that the at least one arm contacts the at least one standoff.

8. The method of claim 7, wherein an extension of the at least one arm from the press plate is variable, the method further including:

determining a desired extension of the at least one arm from the press plate; and maneuvering the at least one arm to the desired extension.

9. The method of claim 8, wherein determining a desired extension of the at least one arm includes:

assembling a hub to a disk with the at least one arm at an initial extension position;

evaluating a planarity of the assembled hub relative to the disk; and generating an extension correction value based upon the planarity evaluation.

10. The method of claim 9, wherein the hub placement device assembly three arms extending from the press plate and the disk support assembly includes three reciprocal standoffs, and wherein an extension correction value is generated for each of the three arms.

11. The method of claim 9, wherein generating an extension correction value includes referencing a correction look-up table.

12. The method of claim 1, wherein transferring the defined three-dimensional position and orientation of the first major surface to the hub placement device includes:

providing a disk support assembly for supporting the disk, the disk support assembly including a support fixture for affixing the first major surface of the disk at the defined three-dimensional position and orientation, a base plate secured to the support fixture and a standoff extending from the base plate apart from the support fixture such that the standoff extends to a known height relative to the defined three-dimensional position of the first major surface; and providing the hub placement device with a press plate for directing the hub toward the disk and an arm having a known extension from the press plate, the arm being positioned to selectively engage the standoff;

wherein upon contact between the arm and the standoff, the determined three-dimensional position and orientation of the first major surface is transferred from the support fixture to the press plate.

13. A method of assembling a hub to an optical disk with an adhesive, the optical disk having first and second major surfaces and a central opening, the adhesive being predisposed onto the second major surface for adhering the hub, the method including:

supporting the first major surface of the disk at a defined three-dimensional position and orientation in space;

supporting an inner portion of the hub above the central opening of the disk such that the hub is moveable to a plurality of three-dimensional positions and orientations;

defining a desired three-dimensional position and orientation of the hub based upon the defined three-dimensional position and orientation of the first major surface; and directing the hub into contact with the adhesive on the second major surface of the disk at the desired three-dimensional position and orientation, whereby the hub is parallel to the first major surface of the disk.

14. The method of claim 13, wherein the adhesive is deformable to allow movement of the hub to the desired three-dimensional position and orientation upon contact with the adhesive.

15. The method of claim 13, further including:

providing a hub placement assembly including a compliant hub support for biasing the hub above the disk and a press plate for selectively engaging the hub and directing the hub into contact with the adhesive.

16. The method of claim 15, wherein providing a hub placement assembly includes providing a press plate comprised of an ultraviolet transmissible material.

17. The method of claim 15, wherein directing the hub into contact with the adhesive includes guiding the press plate toward the disk with a force sufficient to overcome a bias of the compliant hub support.

18. The method of claim 17, wherein the disk is supported by a disk support assembly having at least one standoff extending substantially perpendicular to the first and second major surfaces and spaced from the disk, and wherein the hub placement assembly includes at least one arm extending from the press plate and aligned with the at least one standoff, and further wherein guiding the press plate includes:

directing the press plate toward the disk such that the at least one arm contacts the at least one standoff.

19. The method of claim 18, wherein an extension of the at least one arm from the press plate is variable, the method further including:

assembling a first hub to a first disk with the at least one arm at an initial extension position;

evaluating a planarity of the first hub relative to the first disk;

generating an extension correction value based upon the planarity evaluation; and repositioning the at least one arm according to the correction value.

* * * * *